US010793056B2

(12) United States Patent
Horn

(10) Patent No.: US 10,793,056 B2
(45) Date of Patent: Oct. 6, 2020

(54) SNOW PLOW HEADLAMP

(71) Applicant: Douglas Dynamics, L.L.C., Milwaukee, WI (US)

(72) Inventor: Christopher Aaron Horn, Menomonee Falls, WI (US)

(73) Assignee: Douglas Dynamics, L.L.C., Milwaukee, WI (US)

( * ) Notice: Subject to any disclaimer, the term of this patent is extended or adjusted under 35 U.S.C. 154(b) by 124 days.

(21) Appl. No.: 16/157,813

(22) Filed: Oct. 11, 2018

(65) Prior Publication Data
US 2020/0114803 A1 Apr. 16, 2020

(51) Int. Cl.
| | |
|---|---|
| *B60Q 1/00* | (2006.01) |
| *B60Q 1/18* | (2006.01) |
| *B60Q 1/24* | (2006.01) |
| *F21S 41/39* | (2018.01) |
| *F21S 41/20* | (2018.01) |
| *F21S 41/29* | (2018.01) |
| *F21S 41/143* | (2018.01) |
| *F21Y 115/10* | (2016.01) |
| *E01H 5/06* | (2006.01) |
| *B60Q 1/04* | (2006.01) |

(52) U.S. Cl.
CPC ............ *B60Q 1/0041* (2013.01); *B60Q 1/18* (2013.01); *B60Q 1/24* (2013.01); *F21S 41/143* (2018.01); *F21S 41/28* (2018.01); *F21S 41/29* (2018.01); *F21S 41/39* (2018.01); *B60Q 1/0483* (2013.01); *E01H 5/061* (2013.01); *F21Y 2115/10* (2016.08)

(58) Field of Classification Search
CPC .......... B60Q 1/0041; B60Q 1/18; B60Q 1/24; B60Q 1/0483; F21S 41/39; F21S 41/28; F21S 41/29; F21S 41/143; F21Y 2115/10; E01H 5/061

USPC ........................................................ 362/459
See application file for complete search history.

(56) References Cited

U.S. PATENT DOCUMENTS

| | | | | | |
|---|---|---|---|---|---|
| 1,205,916 | A | * | 11/1916 | Meador | ..................... F21V 7/09 |
| | | | | | 362/298 |
| 4,758,932 | A | * | 7/1988 | Coons | .................. B60Q 1/0041 |
| | | | | | 362/297 |
| D399,326 | S | | 10/1998 | Kelly | |
| 6,015,219 | A | | 1/2000 | Kelly | |
| 6,138,388 | A | * | 10/2000 | Kost | ......................... E01H 5/06 |
| | | | | | 307/10.8 |

(Continued)

OTHER PUBLICATIONS

Jason Torchinsky, A Tribute to the Most Un-Appreciated Light: The Cornering Light, Aug. 21, 2014.

*Primary Examiner* — Ali Alavi
(74) *Attorney, Agent, or Firm* — Wood Herron & Evans LLP

(57) ABSTRACT

A snow plow headlamp comprises a housing adapted to be mounted to a frame member of a snow plow assembly, at least a first forwardly directed LED mounted in the housing between opposite ends of the housing and configured to illuminate ahead of a vehicle to which the snow plow assembly is mounted, a second forwardly directed LED mounted in the housing adjacent one of the ends of the housing, a reflector mounted in the housing on a side of the second LED opposite the one end of the housing and configured to reflect light from the second LED to illuminate to a side of the vehicle to which the snow plow assembly is mounted, and a transparent cover mounted to the housing.

20 Claims, 6 Drawing Sheets

(56) References Cited

U.S. PATENT DOCUMENTS

| | | | | |
|---|---|---|---|---|
| 6,332,699 B1* | 12/2001 | Lee | ............... | B60Q 1/0483 |
| | | | | 340/465 |
| 7,073,930 B2* | 7/2006 | Tiesler | ............... | F21V 21/30 |
| | | | | 362/528 |

* cited by examiner

SNOW PLOW HEADLAMP

RELATED APPLICATIONS

N/A.

FIELD OF THE INVENTION

This invention relates generally to snow plows, and more particularly to headlamps for snow plows.

BACKGROUND OF THE INVENTION

A typical snow plow and mount assembly has a mount frame that mounts to the vehicle below the front bumper, and a snow plow assembly that removably mounts to the vehicle via the mount frame. A typical snow plow assembly has a lift frame with arms that are removably received in receivers on the mount frame, an A-frame operably pivotally connected on a rearward end to the lift frame for pivoting about a generally transverse horizontal axis, and a blade operably pivotally connected on a forward end of the A-frame for pivoting about a generally vertical axis. An actuator, for example hydraulic cylinder, is operably connected to the lift frame and the A-frame for pivoting the A-frame and hence blade up and down about the transverse horizontal axis. A pair of actuators, for example hydraulic cylinders, is operably connected to the blade and the A-frame, one actuator being located on each lateral side of the vertical pivot axis, for pivoting the blade about the vertical axis.

Since the blade blocks light from the vehicle's headlamps when in the raised position, it is conventional to mount auxiliary headlamps on the snow plow assembly. A typical lift frame has an upper transverse frame member. Conventional snow plow headlamps are mounted to this frame member. This places them at a vertical position above the blade when in the raised position, thus allowing light from them to illuminate ahead of the vehicle.

A typical plow blade can be as wide as, or even wider than, the vehicle to which it is mounted. An operator must be able to keep track of the ends of the plow blade when plowing to avoid obstacles. Since current snow plow headlamps only illuminate ahead of the vehicle, the ends of the plow blade and their surroundings are not directly illuminated, thus making keeping tack of the ends of the plow blade and surrounding obstacles difficult.

Accordingly, it is desirable to devise a snow plow headlamp which overcomes the shortcomings of current snow plow headlamps.

SUMMARY OF THE INVENTION

In one aspect, a snow plow headlamp comprises a housing adapted to be mounted to a frame member of a snow plow assembly, at least a first forwardly directed LED mounted in the housing between opposite ends of the housing and configured to illuminate ahead of a vehicle to which the snow plow assembly is mounted, a second forwardly directed LED mounted in the housing adjacent one of the ends of the housing, a reflector mounted in the housing on a side of the second LED opposite the one end of the housing and configured to reflect light from the second LED to illuminate to a side of the vehicle to which the snow plow assembly is mounted, and a transparent cover mounted to the housing.

The transparent cover can include a forward facing portion and a side facing portion adjacent to the second LED. The at least a first forwardly directed LED can comprise a plurality of LED's spaced between the second LED and the other end of the housing. Each of the plurality of LED's can include a respective lens mounted in the housing forward of a respective one of the plurality of LED's. The headlamp can further include an intermediate cover between the housing and the transparent cover, the intermediate cover including an opening for each lens. All of the LED's and lenses can be mounted to a printed circuit board which itself is mounted in the housing.

In another aspect, a snow plow assembly comprises a lift frame adapted to be removably connected to a vehicle, an A-frame operably pivotally connected on a rearward end to the lift frame for pivoting about a generally transverse horizontal axis, a blade operably pivotally connected on a forward end of the A-frame for pivoting about a generally vertical axis, and a pair of the aforementioned headlamps mounted to the lift frame.

In another aspect, an accessory headlamp comprises a housing adapted to be mounted to a frame member of an accessory, at least a first forwardly directed light emitter mounted in the housing between opposite ends of the housing and configured to illuminate ahead of the accessory, a second forwardly directed light emitter mounted in the housing adjacent one of the ends of the housing, a reflector mounted in the housing on a side of the second light emitter opposite the one end of the housing and configured to reflect light from the second light emitter to illuminate to a side of the accessory, and a transparent outer lens mounted to the housing, the lens having a first forwardly facing portion and a second sidewardly facing portion adjacent the second light emitter.

In another aspect, an accessory headlamp comprises a housing adapted to be mounted to a frame member of an accessory, at least a first forwardly directed light emitter mounted in the housing between opposite ends of the housing and configured to illuminate ahead of the accessory, a second light emitter mounted in the housing adjacent one of said ends of the housing and configured to project light from the second light emitter to illuminate to a side of the accessory, and a transparent outer lens mounted to the housing, the lens having a first forwardly facing portion and a second sidewardly facing portion adjacent the second light emitter.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 2:
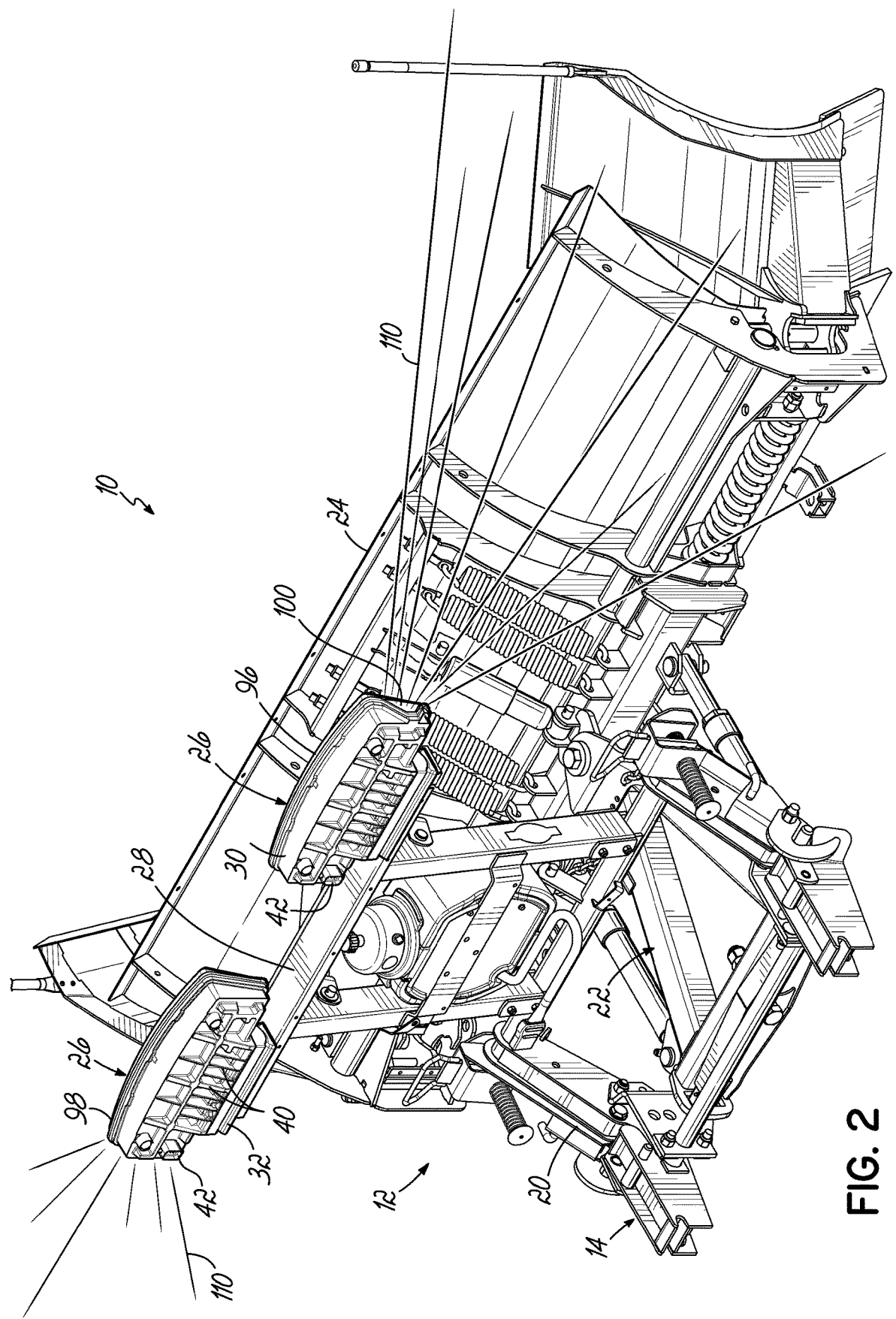
FIG. 2 is a right, rear, top perspective view of the snow plow assembly of FIG. 1.
Figure 3:
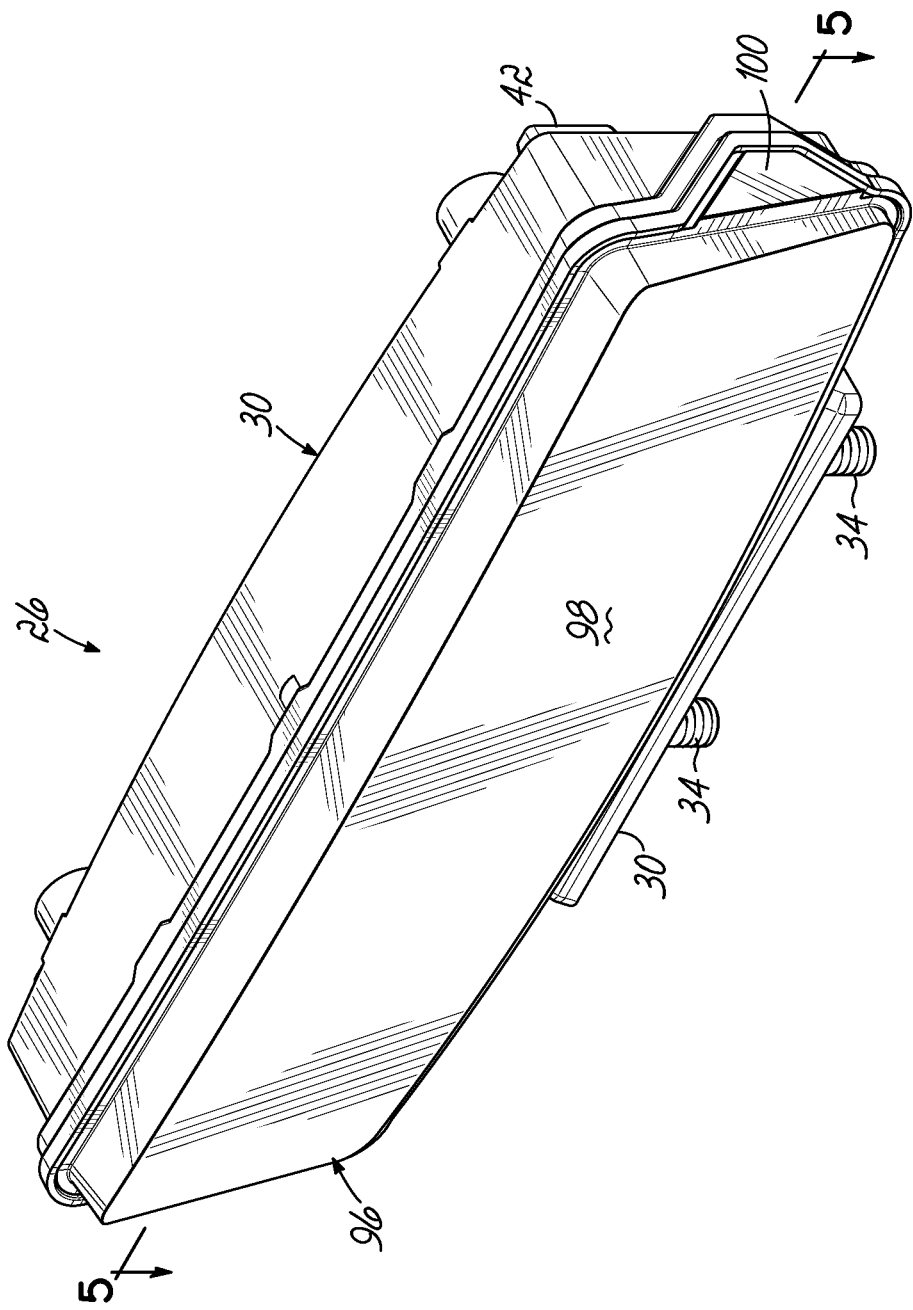
FIG. 3 is a right, front, top perspective view of the driver's side headlamp of FIG. 1.
Figure 4:
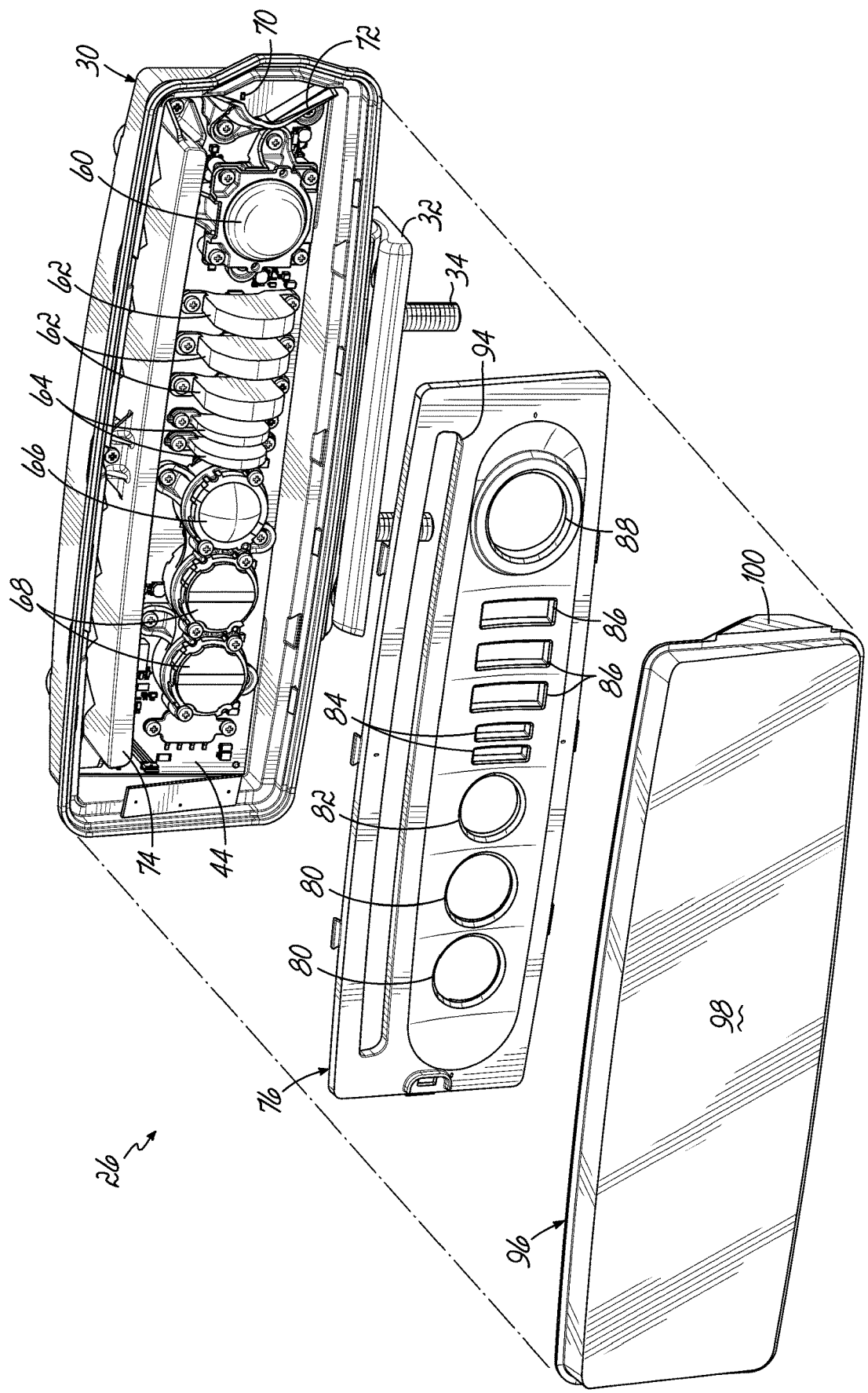
FIG. 4 is an exploded perspective view of the lamp of FIG. 3.
Figure 5:
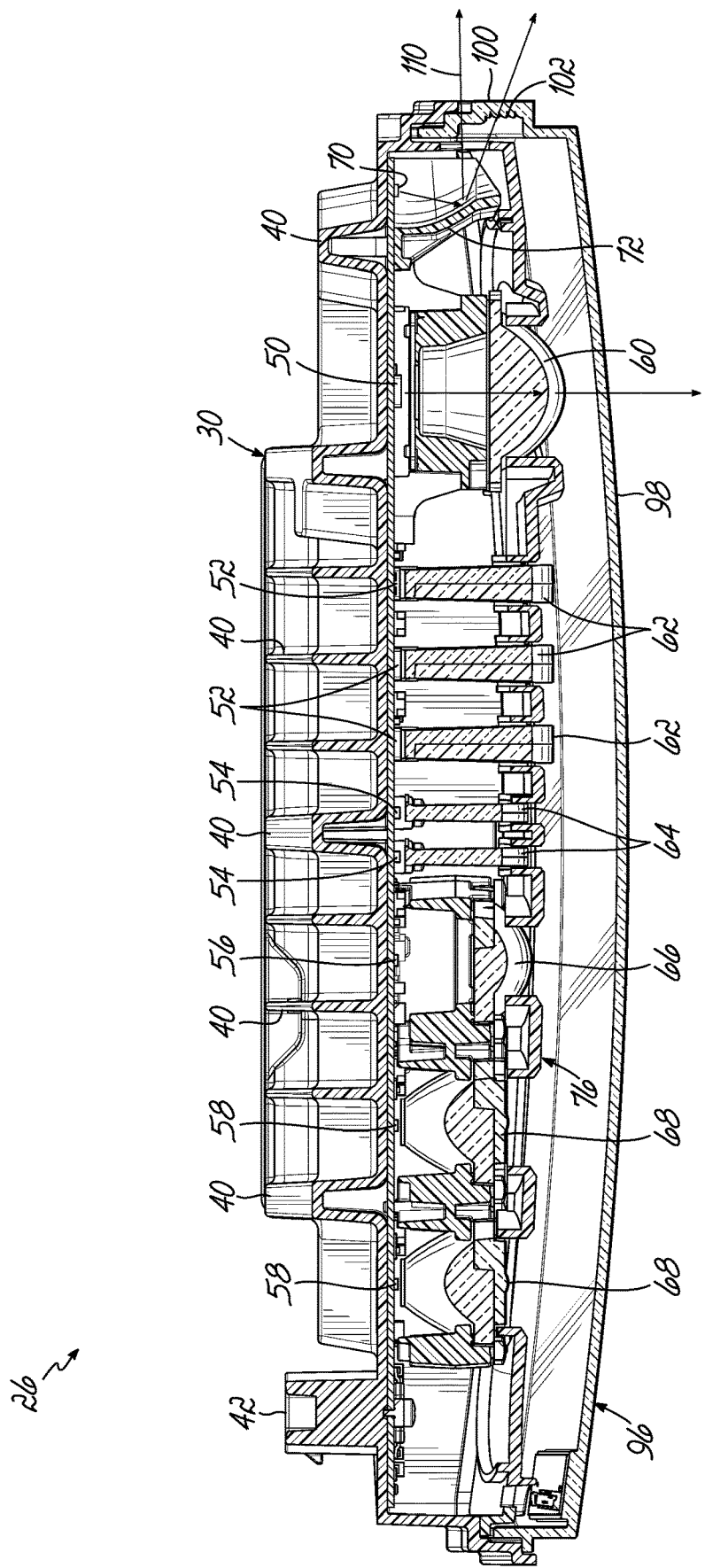
FIG. 5 is a cross-sectional view taken along line 5-5 in FIG. 3.
Figure 6:
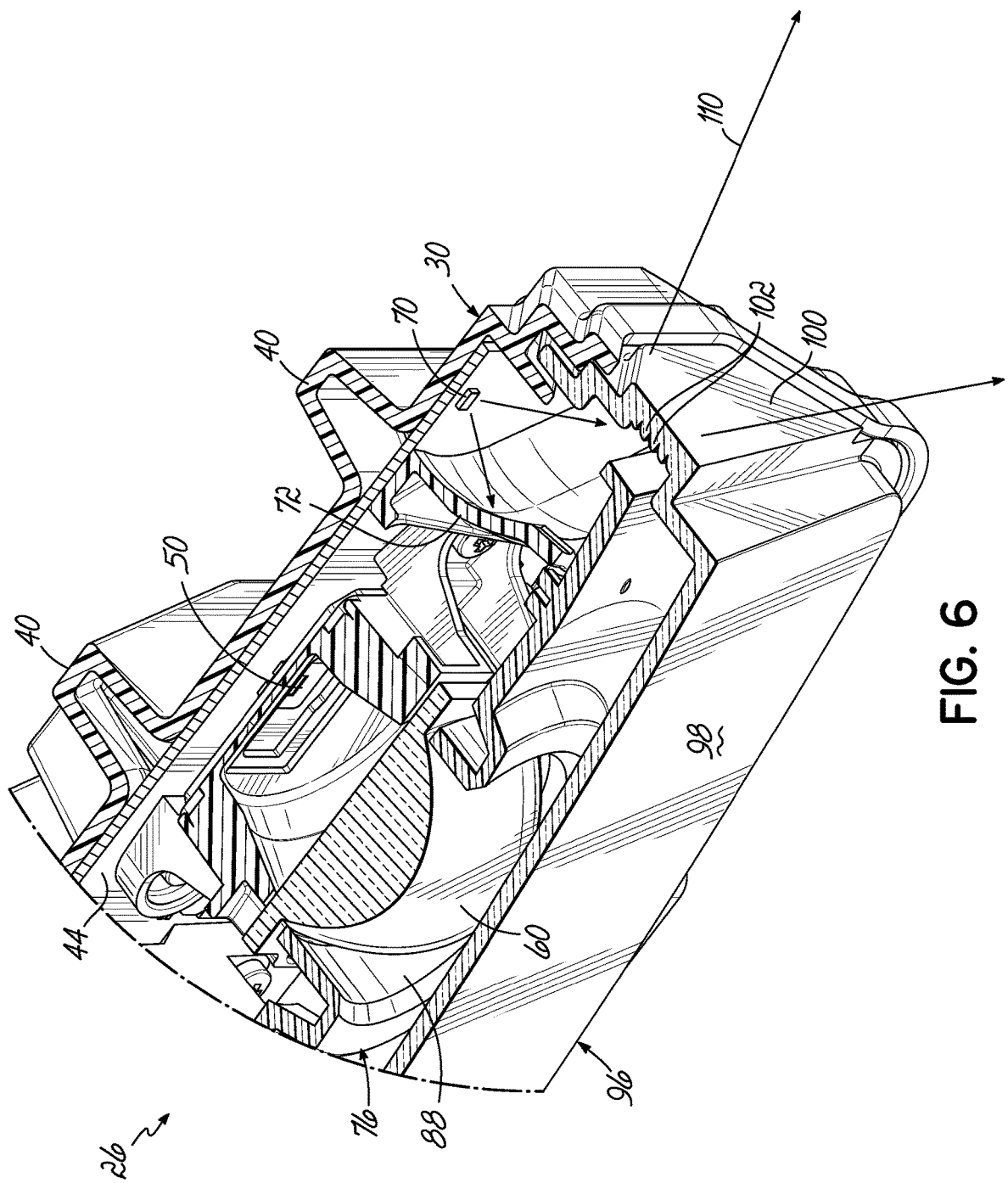
FIG. 6 is a right, front, top, cross-sectional perspective view, enlarged, of the outboard end of the driver's side headlamp.

Referring first to FIG. 2, there is illustrated a snow plow and mount assembly 10. The assembly includes a snow plow assembly 12 and a mount frame 14. The snow plow assembly 12 comprises a lift frame 20 adapted to be removably connected to a vehicle via the mount frame 14, an A-frame 22 operably pivotally connected on a rearward end to the lift frame 20 for pivoting about a generally transverse horizontal axis, a blade 24 operably pivotally connected on a forward end of the A-frame 22 for pivoting about a generally vertical axis, and a pair headlamps 26 mounted to an upper transverse frame member 28 of the lift frame 20.

Referring now to FIGS. 3-6, each headlamp 26 includes a housing 30 mounted to a base or mounting plate 32. Base 32 includes a pair of threaded bolts or posts 34 that pass through holes in the upper transverse frame member 28 of the lift frame 20 onto which are threaded nuts (not shown) to secure the headlamp 26 to the frame member 28. Housing 30 can be fabricated of Xenoy which prevents rust and corrosion.

A rear side of the housing 30 includes a number of stiffening ribs 40, and a plug or integral connector 42 for connecting a wiring harness (not shown) to the headlamp 26 to supply electricity from the vehicle's electrical system to the headlamp 26.

A main printed circuit board ("PCB") 44 is mounted in the housing 30. The PCB 44 has a plurality of white light emitting diode light engines ("LED's") mounted to it. For example, the headlamp 26 can include LED 50, three LED's 52, two LED's 54, LED 56, and two LED's 58. The LED 50 is the LED light engine for a Low Beam ("LB") aspherical lens. The LED's 52 are the LED light engines for wide spread D-lenses. The LED's 54 are the LED light engines for skinny fog D-lenses. The LED 56 is the LED light engine for a High Beam ("HB") aspherical lens. The LED's 58 are the LED light engines for HB Compound Parabolic Concentrator ("CPC") lenses. The PCB 44 further has a plurality of lenses mounted to it, each of which corresponds to one of the LED's. For example, the headlamp can include lens 60, three lenses 62, two lenses 64, lens 66, and two lenses 68. The lens 60 is an aspherical lens. The lenses 62 are wide spread D-lenses. The lenses 64 are skinny fog D-lenses. The lens 66 is an HB aspherical lens. The lenses 68 are HB CPC lenses. The LED's 50, 52, 54, 56, and 58, and their respective lenses 60, 62, 64, 66, and 68, provide forwardly directed illumination for the vehicle driver. Suitable LED's 50, 52, 54, 56, and 58, and respective lenses 60, 62, 64, 66, and 68, are available from J. W. Speaker of Germantown, Wis. Other combinations of LED's and lenses can be used.

The PCB 44 has another white light LED 70 mounted to it, adjacent an end of the housing 30. A reflector 72 partially surrounds LED 70 and serves to reflect light from the LED 70 toward the end of the housing 30. A suitable LED 70 is model number 7416030 available from J. W. Speaker of Germantown, Wis. The reflector 72 may be fabricated of polycarbonate, and it may have a faceted geometry.

The PCB 44 also has a light blade optic 74 mounted to it. The purpose of the light blade optic 74 is to provide compliant optical patterns for daytime running lights, turn signals, and front position functions.

The headlamp 26 includes an inner or intermediate cover or bezel 76 that can be fabricated of polycarbonate. The cover 76 includes openings 80, 82, 84, 86, and 88 to accommodate lenses 60, 62, 64, 66, and 68, respectively. The cover 76 also includes an opening 94 to accommodate the light blade optic 74.

The headlamp 26 also includes an outer transparent cover or lens assembly 96 that can be fabricated of UV-resistant polycarbonate. Cover 96 includes a forward facing portion 98 and a side facing portion or window 100 adjacent LED 70. Side facing portion 100 includes a plurality of vertical, V-shaped in cross-section grooves 102, referred to as B-surface optics, the purpose of which is create the desired optical pattern to illuminate the end of the plow blade and beyond. Cover 96 is a snap fit to housing 30, sandwiching intermediate cover 76 between it and housing 30.

Figure 1:
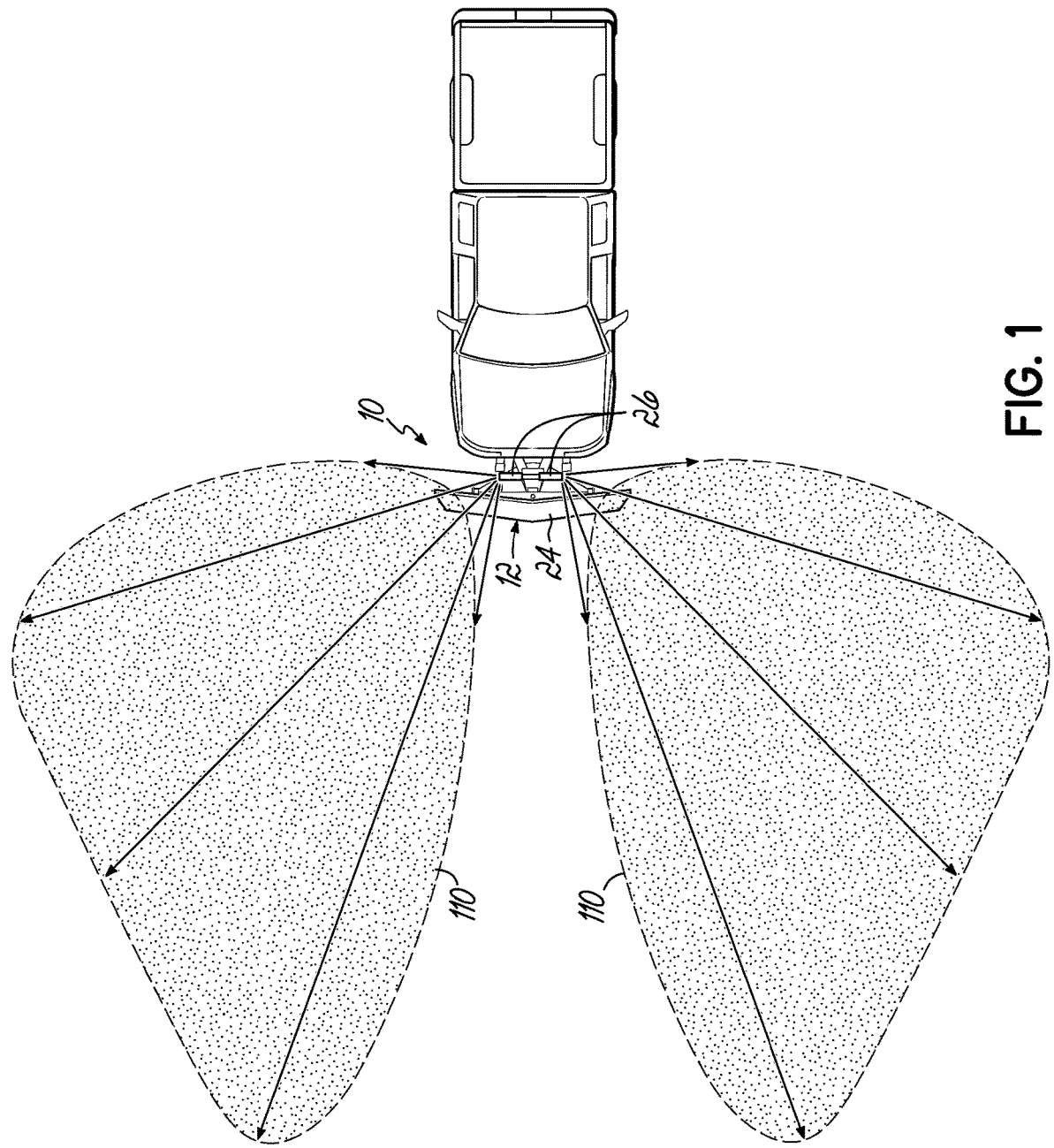
FIG. 1 is a top view of a snow plow assembly mounted to a vehicle, the snow plow assembly including a pair of the inventive headlamps according to the principles of the present invention.

Referring now to FIG. 1, there is illustrated the light beam pattern 110 generated by LED 70 and reflector 72 for each headlamp 26 as light from the LED 70 passes through side facing portion 98 of transparent cover 96. As can be seen, the LED's 70 and reflectors 72 of the headlamps 26 effectively illuminate the ends of the plow blade 24 and beyond, allowing an operator to safely avoid any obstacles that the ends of the plow blade 24 might otherwise come in contact with.

While the invention has been described as utilizing extremely energy-efficient LED's, which are solid light bulbs, the light from which is directional, it is to be appreciated that the invention can also be practiced with light emitters other than LED's, for example light emitting incandescent bulbs, the light from which is spread more spherically, halogen bulbs, etc. Moreover, while the invention has been described as utilizing a reflector to reflect light from the LED 70 laterally outwardly toward the end of the housing 30, it is to be appreciated that the invention could also be practiced without such a reflector, with the LED 70 (or other light emitter) being configured, positioned, oriented, etc. to project light laterally outwardly toward the end of the housing 30. Accordingly, all such variations are embraced by the scope of the invention.

While the invention has been described as being used in conjunction with snow plows, the invention can also be practiced in conjunction with accessories other than vehicle mounted snow plows.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:
1. A snow plow headlamp comprising:
    a housing adapted to be mounted to a frame member of a snow plow assembly,
    at least a first forwardly directed LED mounted in said housing between opposite ends of said housing and configured to illuminate ahead of a vehicle to which the snow plow assembly is mounted, a second forwardly directed LED mounted in said housing adjacent one of said ends of said housing, a reflector mounted in said housing on a side of said second LED opposite said one end of said housing and configured to reflect light from said second LED to illuminate to a side of the vehicle to which the snow plow assembly is mounted, and a transparent cover mounted to said housing.

2. The headlamp of claim 1 wherein said transparent cover includes a forward facing portion and a side facing portion adjacent said second LED.

3. The headlamp of claim 1 wherein said at least a first forwardly directed LED comprises a plurality of LED's spaced between said second LED and the other end of said housing.

4. The headlamp of claim 3 wherein each of said plurality of LED's includes a respective lens mounted in said housing forward of a respective one of said plurality of LED's.

5. The headlamp of claim 4 further including an intermediate cover between said housing and said transparent cover, said intermediate cover including an opening for each said lens.

6. The headlamp of claim 5 wherein all said LED's and said lenses are mounted to a printed circuit board, said printed circuit board mounted in said housing.

7. A snow plow assembly comprising:
a lift frame adapted to be removably connected to a vehicle,
an A-frame operably pivotally connected on a rearward end to said lift frame for pivoting about a generally transverse horizontal axis,
a blade operably pivotally connected on a forward end of said A-fame for pivoting about a generally vertical axis, and
a pair of headlamps mounted to said lift frame, each of said pair of headlamps comprising:
a housing adapted to be mounted to a frame member of a snow plow assembly,
at least a first forwardly directed LED mounted in said housing between opposite ends of said housing and configured to illuminate ahead of a vehicle to which the snow plow assembly is mounted,
a second forwardly directed LED mounted in said housing adjacent one of said ends of said housing,
a reflector mounted in said housing on a side of said second LED opposite said one end of said housing and configured to reflect light from said second LED to illuminate to a side of the vehicle to which the snow plow assembly is mounted, and
a transparent cover mounted to said housing.

8. The snow plow assembly of claim 7 wherein said transparent cover includes a forward facing portion and a side facing portion adjacent said second LED.

9. The snow plow assembly of claim 7 wherein said at least a first forwardly directed LED comprises a plurality of LED's spaced between said second LED and the other end of said housing.

10. The snow plow assembly of claim 9 wherein each of said plurality of LED's includes a respective lens mounted in said housing forward of a respective one of said plurality of LED's.

11. The snow plow assembly of claim 10 further including an intermediate cover between said housing and said transparent cover, said intermediate cover including an opening for each said lens.

12. The snow plow assembly of claim 11 wherein all said LED's and said lenses are mounted to a printed circuit board, said printed circuit board mounted in said housing.

13. A snow plow headlamp comprising:
a housing adapted to be mounted to a frame member of a snow plow assembly,
at least a first forwardly directed light emitter mounted in said housing between opposite ends of said housing and configured to illuminate ahead of a vehicle to which the snow plow assembly is mounted,
a second forwardly directed light emitter mounted in said housing adjacent one of said ends of said housing,
a reflector mounted in said housing on a side of said second light emitter opposite said one end of said housing and configured to reflect light from said second light emitter to illuminate to a side of the vehicle to which the snow plow assembly is mounted, and
a transparent outer lens mounted to said housing, said lens having a first forwardly facing portion and a second sidewardly facing portion adjacent said second light emitter.

14. The snow plow headlamp of claim 13 wherein said light emitters are LED's.

15. An accessory headlamp comprising:
a housing adapted to be mounted to a frame member of an accessory,
at least a first forwardly directed light emitter mounted in said housing between opposite ends of said housing and configured to illuminate ahead of the accessory,
a second forwardly directed light emitter mounted in said housing adjacent one of said ends of said housing,
a reflector mounted in said housing on a side of said second light emitter opposite said one end of said housing and configured to reflect light from said second light emitter to illuminate to a side of the accessory, and
a transparent outer lens mounted to said housing, said lens having a first forwardly facing portion and a second sidewardly facing portion adjacent said second light emitter.

16. The accessory headlamp of claim 15 wherein said light emitters are LED's.

17. The accessory headlamp of claim 15 wherein the accessory is a vehicle mounted snow plow.

18. An accessory headlamp comprising:
a housing adapted to be mounted to a frame member of an accessory,
at least a first forwardly directed light emitter mounted in said housing between opposite ends of said housing and configured to illuminate ahead of the accessory,
a second light emitter mounted in said housing adjacent one of said ends of said housing and configured to project light from said second light emitter to illuminate to a side of the accessory, and
a transparent outer lens mounted to said housing, said lens having a first forwardly facing portion and a second sidewardly facing portion adjacent said second light emitter.

19. The accessory headlamp of claim 18 wherein said light emitters are LED's.

20. The accessory headlamp of claim 18 wherein the accessory is a vehicle mounted snow plow.

* * * * *